US009411424B2

(12) United States Patent
Matsubara et al.

(10) Patent No.: US 9,411,424 B2
(45) Date of Patent: Aug. 9, 2016

(54) INPUT DEVICE FOR OPERATING GRAPHICAL USER INTERFACE

(71) Applicant: HITACHI MAXELL, LTD., Osaka (JP)

(72) Inventors: Takashi Matsubara, Chigasaki (JP); Tomochika Ozaki, Yokohama (JP); Tatsuya Tokunaga, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/869,111

(22) Filed: Sep. 29, 2015

(65) Prior Publication Data

US 2016/0018903 A1    Jan. 21, 2016

Related U.S. Application Data

(63) Continuation of application No. 12/760,596, filed on Apr. 15, 2010, now Pat. No. 9,164,578.

(30) Foreign Application Priority Data

Apr. 23, 2009   (JP) .................................. 2009-104641

(51) Int. Cl.

| G06F 3/00 | (2006.01) |
|---|---|
| G06F 3/048 | (2013.01) |
| G06F 3/033 | (2013.01) |
| G06F 3/01 | (2006.01) |
| G06F 3/03 | (2006.01) |
| G06F 3/0484 | (2013.01) |

(52) U.S. Cl.

CPC ................ *G06F 3/017* (2013.01); *G06F 3/011* (2013.01); *G06F 3/0304* (2013.01); *G06F 3/0484* (2013.01)

(58) Field of Classification Search
None
See application file for complete search history.

(56) References Cited

U.S. PATENT DOCUMENTS

| 5,594,469 | A | 1/1997 | Freeman et al. |
| 7,844,921 | B2 | 11/2010 | Ike et al. |
| 2004/0189720 | A1 | 9/2004 | Wilson et al. |
| 2004/0193413 | A1 | 9/2004 | Wilson et al. |
| 2005/0086611 | A1 | 4/2005 | Takabe et al. |
| 2006/0209021 | A1 | 9/2006 | Yoo et al. |

(Continued)

FOREIGN PATENT DOCUMENTS

| CN | 101131609 | 2/2008 |
| EP | 2 040 156 | 3/2009 |

(Continued)

OTHER PUBLICATIONS

Go Diego Go! Safari Rescue Nintendo Wii game. 2K Play. Official release date Feb. 11, 2008.

(Continued)

*Primary Examiner* — Stephen Alvesteffer
(74) *Attorney, Agent, or Firm* — Baker Botts L.L.P.

(57) ABSTRACT

An input device includes an input unit for inputting a predetermined motion image signal, a motion detector for detecting a motion on the basis of the motion image signal inputted into the input unit, a video signal processor for outputting a predetermined video signal, and a controller. The controller controls the video signal processor so that, when a motion detector detects a first motion, the video signal processor outputs a video signal to explain a predetermined second motion to be next detected by the motion detector after the detection of the first motion to a user.

5 Claims, 9 Drawing Sheets

(56) References Cited

U.S. PATENT DOCUMENTS

| | | |
|---|---|---|
| 2007/0150842 A1 | 6/2007 | Chaudhri et al. |
| 2008/0052643 A1 | 2/2008 | Ike et al. |
| 2008/0062125 A1 | 3/2008 | Kitaura |
| 2008/0141181 A1 | 6/2008 | Ishigaki et al. |
| 2008/0178126 A1 | 7/2008 | Beeck et al. |
| 2008/0215975 A1 | 9/2008 | Harrison et al. |
| 2009/0027337 A1 | 1/2009 | Hildreth |
| 2009/0073117 A1 | 3/2009 | Tsurumi et al. |
| 2009/0079813 A1 | 3/2009 | Hildreth |
| 2009/0178011 A1* | 7/2009 | Ording ............ G06F 9/4446 715/863 |
| 2009/0187824 A1 | 7/2009 | Hinckley et al. |
| 2009/0217211 A1 | 8/2009 | Hildreth et al. |
| 2009/0228841 A1 | 9/2009 | Hildreth |
| 2010/0031202 A1 | 2/2010 | Morris et al. |
| 2010/0050133 A1 | 2/2010 | Nishihara et al. |
| 2010/0058252 A1 | 3/2010 | Ko |
| 2014/0223299 A1 | 8/2014 | Han |

FOREIGN PATENT DOCUMENTS

| | | |
|---|---|---|
| JP | 8-315154 | 11/1996 |
| JP | 2001-216069 | 8/2001 |
| JP | 2004-326189 | 11/2004 |
| JP | 2004-356819 | 12/2004 |
| JP | 2005-250785 | 9/2005 |
| JP | 2006-79281 | 3/2006 |
| JP | 2007-122136 | 5/2007 |
| JP | 2007-213245 | 8/2007 |
| JP | 2008-052590 | 3/2008 |
| JP | 2009-75685 | 4/2009 |
| KR | 10-2006-0101071 | 9/2006 |

OTHER PUBLICATIONS

European Search Report issued in European Patent Application No. 10250809.0 on Aug. 1, 2013.

Office Action issued in Japanese Patent Application No. 2009-104641 on Aug. 21, 2012.

* cited by examiner

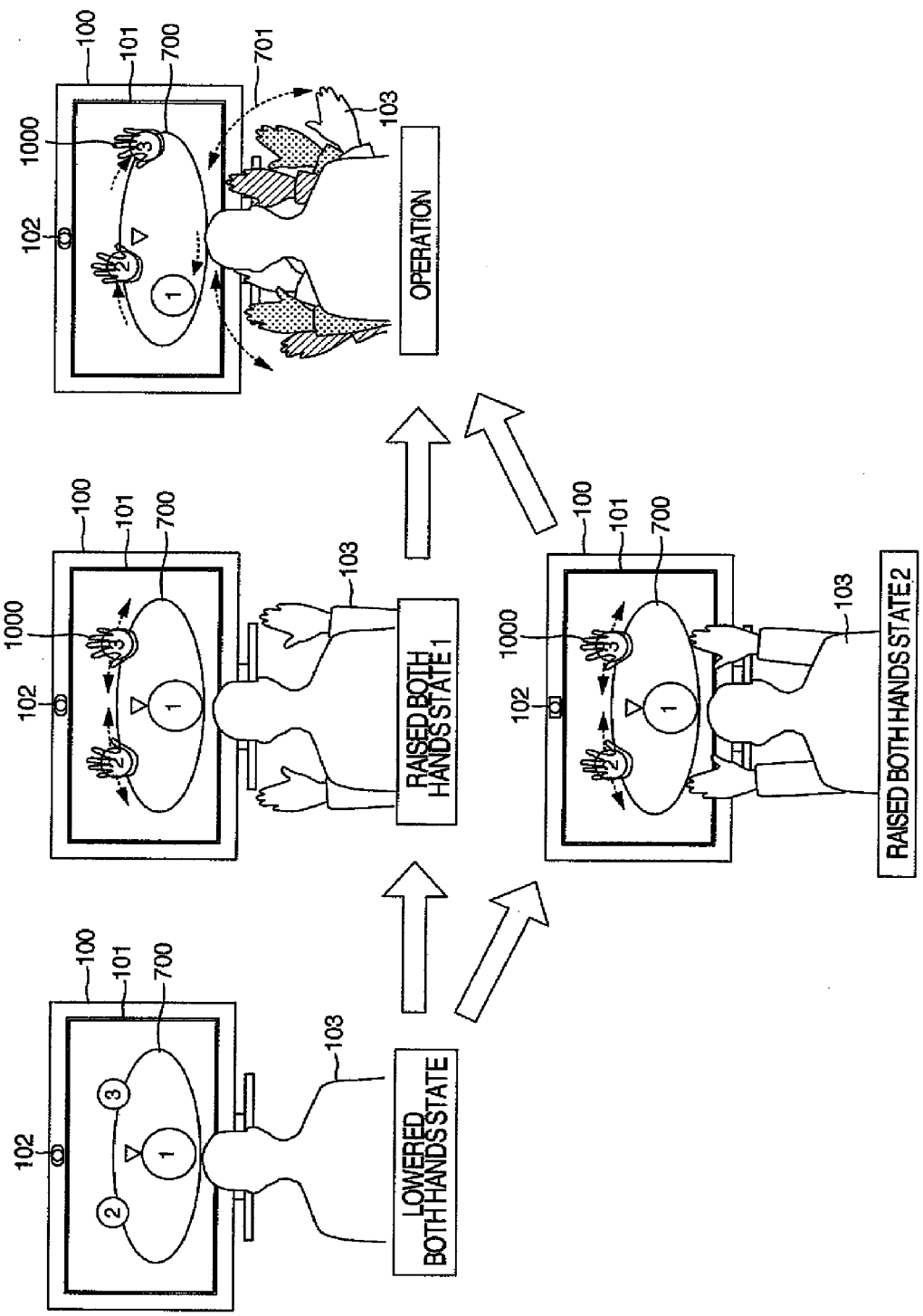

INPUT DEVICE FOR OPERATING GRAPHICAL USER INTERFACE

INCORPORATION BY REFERENCE

The present application is a continuation of U.S. patent application Ser. No. 12/760,596, filed on Apr. 15, 2010, which claims priority to Japanese Patent Application No. 2009-104641, filed on Apr. 23, 2009, the contents of both of which are hereby incorporated by reference into this application.

BACKGROUND OF THE INVENTION

The present invention relates to an input device.

SUMMARY OF THE INVENTION

Personal computers or televisions, which accept user's (operator's) operation via a graphical user interface (which will be referred to as GUI, hereinafter) and simultaneously provide a feedback as a result of the user's operation to the user, have come into widespread use.

Patent Document 1 discloses a portable terminal which shows operation guidance information for assist user's operation. The user can execute a target function by moving her or his finger in an up, down, left or right direction according to the guidance.

Patent Document 2 discloses an interface device which displays a gesture image to visually indicate a recognition target of a gesture as user's operation. The user can conduct device operation while confirming the gesture image.

Patent Document 3 discloses a vehicle-mounted device which displays user's allowable operations and icons indicative of gestures corresponding to user's allowable operations. The user can easily know a gesture for the user to be conducted.

Patent Document 4 discloses an operation input device for vehicles which displays selection guide information indicative of the state of a user's hand placed on a steering wheel and an operation target device. The user can select a target operation device by referring to the guide and moving her or his hand to the target device.

PRIOR ART DOCUMENTS

Patent Document 1: JP-A-2007-213245
Patent Document 2: JP-A-2008-52590
Patent Document 3: JP-A-2001-216069
Patent Document 4: JP-A-2005-250785

Any of the aforementioned Patent Documents discloses the fact that a motion and/or pose for user's operation is displayed and the user can conduct an operation (action) relating to a predetermined device according to the motion or pose.

When the user tries to conduct a predetermined motion or take a predetermined pose for her or his intended operation, however, the user may erroneously conduct another unintended motion or take another unintended pose during user's motion or pose as far as the predetermined motion or pose. The unintended motion or pose may erroneously be recognized as an action for user's operation, As a result, the operation for the user not to intend may undesirably be carried out.

For example, the user tries to move her or his hand in a right direction for the purpose of moving a displayed content to the right direction, an action returning the hand located at the right side to a left direction may be erroneously recognized as an action moving the content to the left direction and be erroneously carried out.

In other words, any of the above Patent Documents pays no consideration to such a device that, when the user conducts a gesture for user's operation, the user can intuitively understand whether or not user's each motion is recognized.

In view of such circumstances, it is therefore an object of the present invention is to provide an input device having a good handleability which causes a user to know as to how user's motion is recognized by the input device to avoid execution of an unintended operation.

In accordance with the present invention, the above object is attained by providing an input device which includes an input unit for inputting operator's motion as an image signal, a motion detector for detecting the motion on the basis of the image signal inputted into the input unit, a display unit for displaying a graphical user interface, and a controller for causing the display unit to change a display of the graphical user interface according to the motion detected by the motion detector. The controller causes the display unit to display a motion synchronized with the motion detected by the motion detector and also to change the display of the graphical user interface.

In this case, the display of the graphical user interface is intended to move display positions of the plurality of selection items for the purpose of selecting desired one of a plurality of selection items, and the controller causes the display unit to display a motion synchronized with the motion detected by the motion detector and also to move the display positions of the plurality of selection items according to the motion.

In the input device, the controller causes the display unit to display an operator's motion which is to be desirably detected by the motion detector for the purpose of explaining the fact that what kind of motion results in what type of operation to the operator before actually conducting a motion.

In this connection, the display of the graphical user interface is used for the operator to move display positions of the plurality of selection items for the purpose of selecting desired one of the plurality of selection items, and the controller causes the display unit to display a motion which is necessary to move the display positions of the plurality of selection items and which is to be desirably detected by the motion detector.

According to the present invention, for example, when the user tries to conduct an operation for a device such as a television with a gesture, the user can know as to how a gesture being now conducted by the user is recognized and thereby conduct such a gesture as to carry out its intended operation.

Other objects, features and advantages of the invention will become apparent from the following description of the embodiments of the invention taken in conjunction with the accompanying drawings.

BRIEF DESCRIPTION OF THE DRAWINGS

FIG. 10 is a diagram for explaining operations of a user of an input device in accordance with an embodiment 3 and associated operations of the input device.

DESCRIPTION OF THE EMBODIMENTS

Explanation will be made in connection with embodiments to which the present invention is applied.
Embodiment 1:

An input device 100 in accordance with the embodiment of the present invention detects an action of user's hand from an imaged dynamic picture image of the user and changes a display of a GUI according to the action.

Figure 1A:
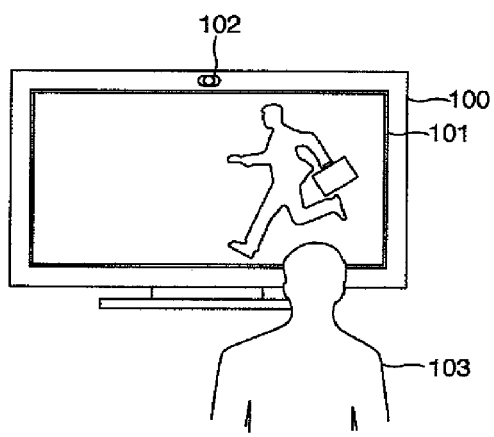
FIGS. 1A and 1B are diagrams for explaining an input device in accordance with an embodiment 1.
Figure 1B:
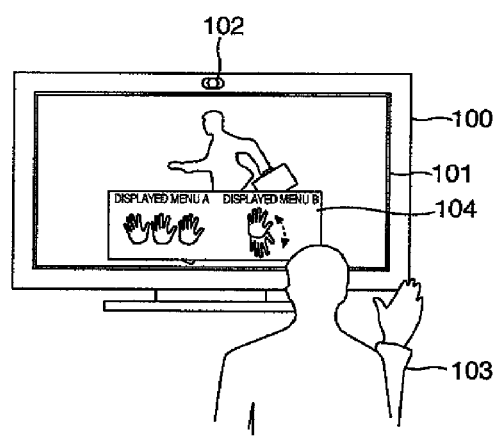

FIGS. 1A and 1B schematically show an operational environment when the user uses the input device 100 through a display unit 101, an image pickup 102, a user 103, and an operational guide 104.

The display unit 101, forms a display section of the input device 100, is a display such as a liquid crystal display or a plasma display. The display unit 101 has a display panel, a panel control circuit, and a panel control driver; and acts to display video data supplied from a video signal processor 202 on the display panel. The image pickup 102 is used to input a dynamic picture image into the input device 100, and a camera as an example can be uses as the image pickup. The user 103 conducts an operation for the input device 100. The operational guide 104 is a GUI displayed on the display unit 101 and has a letter or a diagram for explaining how to operate the input device 100 to the user 103.

Figure 2:
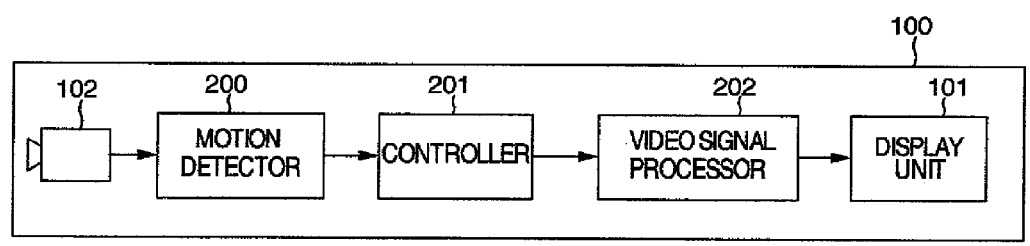
FIG. 2 is a block diagram of an arrangement of the input device in accordance with the embodiment 1.

The input device 100 includes a display unit 101, an image pickup 102, an action or motion detector 200, a controller 201, and a video signal processor 202, as shown, e.g., in FIG. 2.

The action or motion detector 200 receives a dynamic picture image signal from the image pickup 102 and detects operator's action such as operator's extended hand, waving hand or rotating hand on the basis of the received dynamic picture image signal. The motion detector 200 further outputs a predetermined command corresponding to the detected action. The controller 201, which is, for example, a microprocessor, controls the operation of the video signal processor 202 according to the command received from the motion detector 200. The video signal processor 202 can be a processor such as ASIC, FPGA or MPU. The video signal processor 202 converts video data of GUI to data having a format processable by the display unit 101 under control of the controller 201 and then outputs the converted data.

Figure 3:
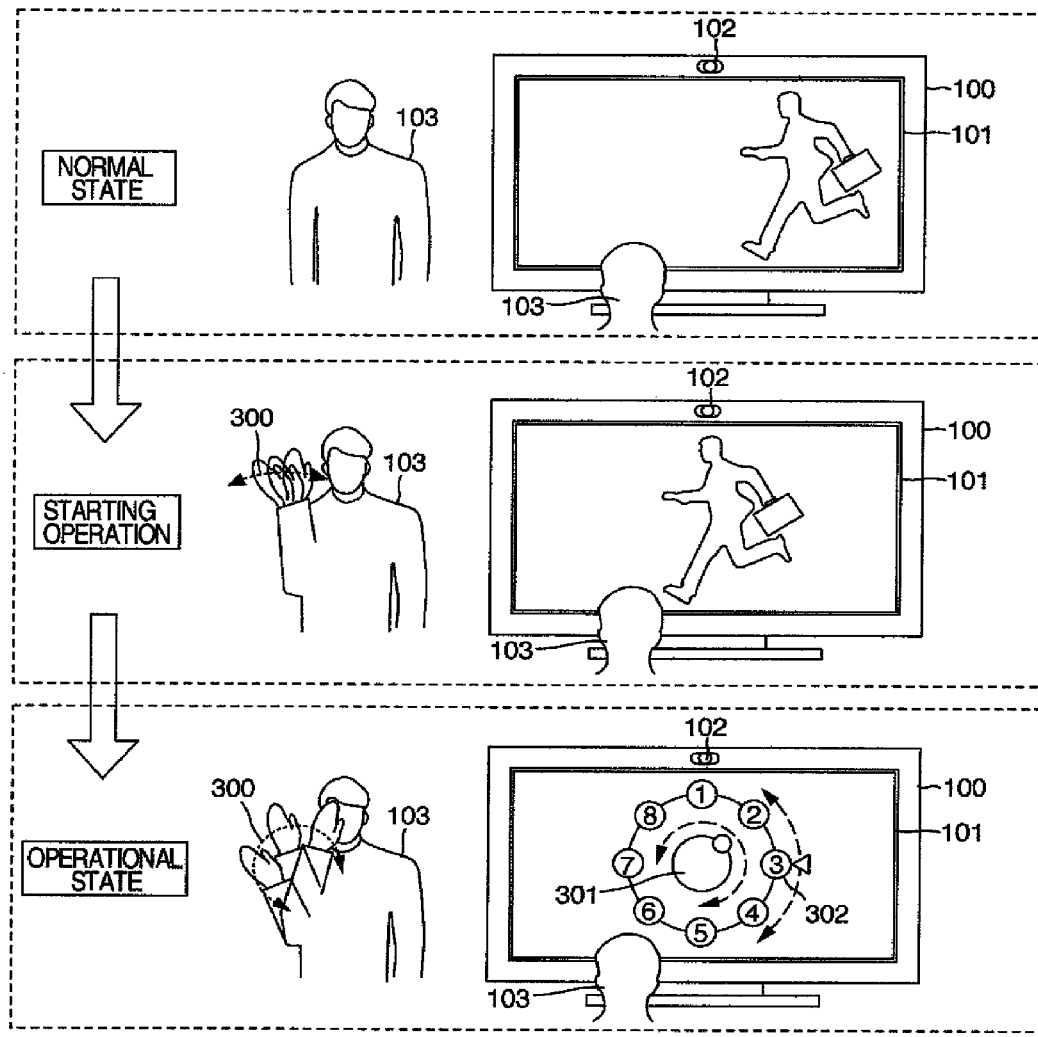
FIG. 3 is a diagram for explaining how a user to operate the input device of the embodiment 1.

FIG. 3 shows relationships among actions of the user 103, associated operations of the display unit 101, and associated displays on the display unit when the input device 100 of the present invention is operated by the user 103. A part of the diagram of FIG. 3 shown by "Normal State" indicates a state where the user 103 does not operate the input device 100. The input device 100 of the present embodiment is arranged to recognize a hand side-to-side waving action 300 of a hand of the user 103 and to start accepting the action of the user 103 in response to a trigger of recognizing the hand side-to-side waving action 300. Thus, when the user 103 extends her or his hand toward the input device 100 and further waves the extended hand side to side as shown in a part of the diagram of FIG. 3 indicated by "Starting Operation", this causes an operational menu to be displayed on the display unit 101 as shown by a part of the diagram of FIG. 3 indicated by "Operating State". The menu has an operating wheel 301 and a plurality of selection items 302. When the user 103 conducts her or his hand rotating action 303, this causes the operating wheel 301 to be correspondingly rotated and the selection items 302 to be rotated and shifted. In this manner, the user 103 can select desired one of the selection items 302.

Figure 4:
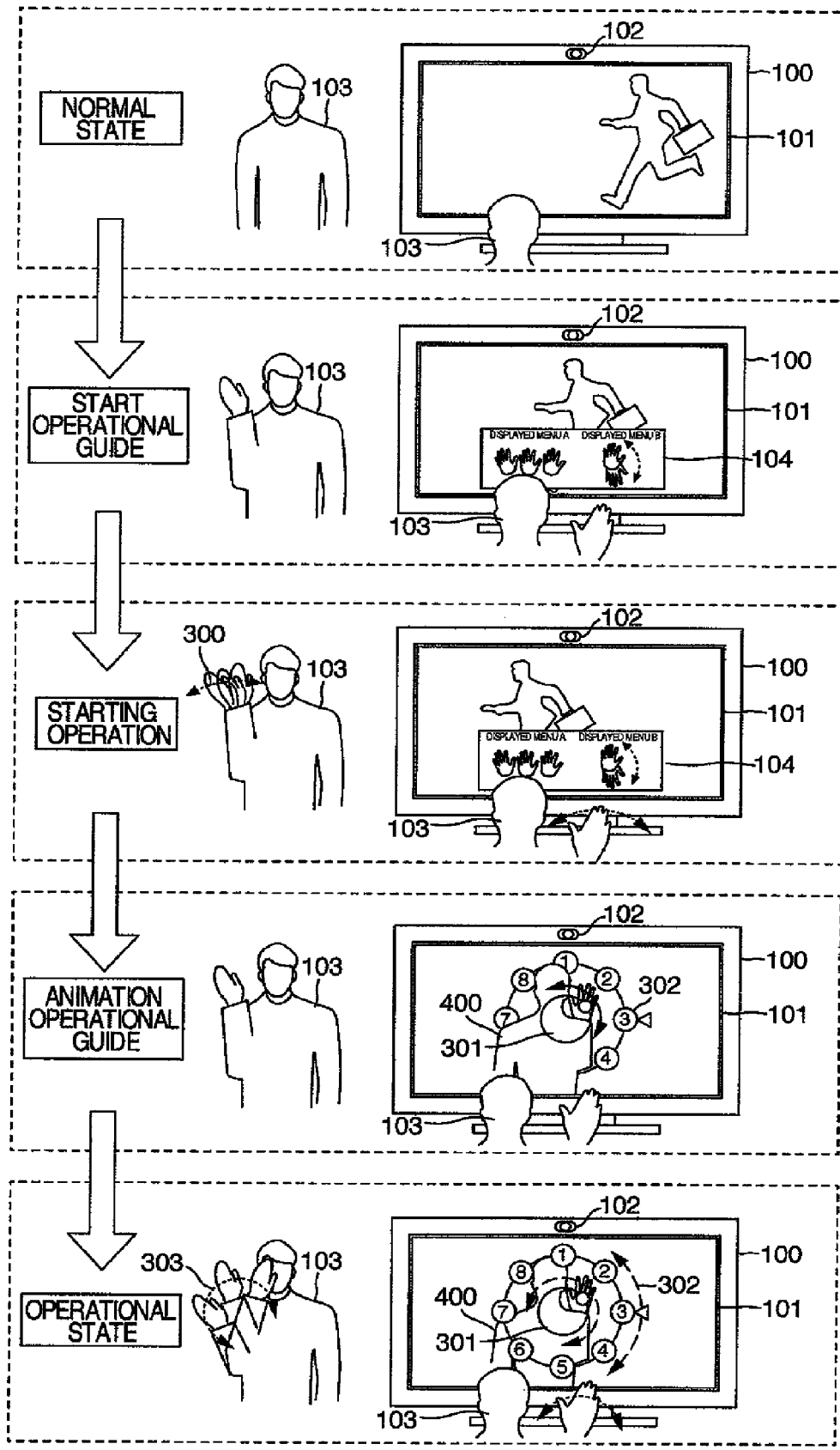
FIG. 4 is a diagram for explaining operations of the user of the embodiment 1 and associated operations of the input device.

FIG. 4 is a diagram for explaining relationships between actions or motions of the user 103 and associated displays of the display unit 101 when the user 103 operates the input device 100 shown in FIG. 3. The display of the display unit includes a displaying way and displaying timing based on the operational guide 104 or an animation operational guide 400. The animation operational guide 400 is used to explain how to operate the menu displayed on the display unit 101 with use of the dynamic picture image to the user.

Explanation will next be made as to the operation of the input device 100 by using FIGS. 1A and 1B to FIG. 4 and a flow chart of FIG. 5.

The input device 100 is used to detect an action of the hand of the user 103 on the basis of a signal of an imaged dynamic picture image of the user 103, and changes the display of the GUI according to the detected action.

Explanation will be first made as to a flow of operations of the input device 100 after the input device 100 detects an action of the hand of the user 103 until the input device displays a GUI according to the detected action, by referring to FIG. 2. First of all, the user 103 starts the operation of the input device 100, for example, by depressing a power button (not shown). The controller 201, in response to the start of the operation, provides an instruction to the video signal processor 202 to display a predetermined video. In response to the instruction, the video signal processor 202 outputs a video signal suitable as an input of the display unit 101. This causes a video to be displayed on the display unit 101.

The controller 201 when responding to the start of the operation instructs the image pickup 102 to start imaging a dynamic picture image. In response o the instruction, the image pickup 102 starts imaging the dynamic picture image, and output data on the imaged dynamic picture image to the motion detector 200. The motion detector 200 detects user's hand motion on the basis of the received dynamic picture image data by a method such as feature point extraction. When the motion detector determines that the hand's action follows a predetermined pattern, the motion detector outputs a command corresponding to the pattern to the controller 201. The controller 201 instructs the video signal processor 202 to display the GUI or to change the display according to the command. In response to the instruction, the video signal processor 202 changes the video signal as an output, which results in that the display of the GUI on the display unit 101 is changed.

Figure 5:
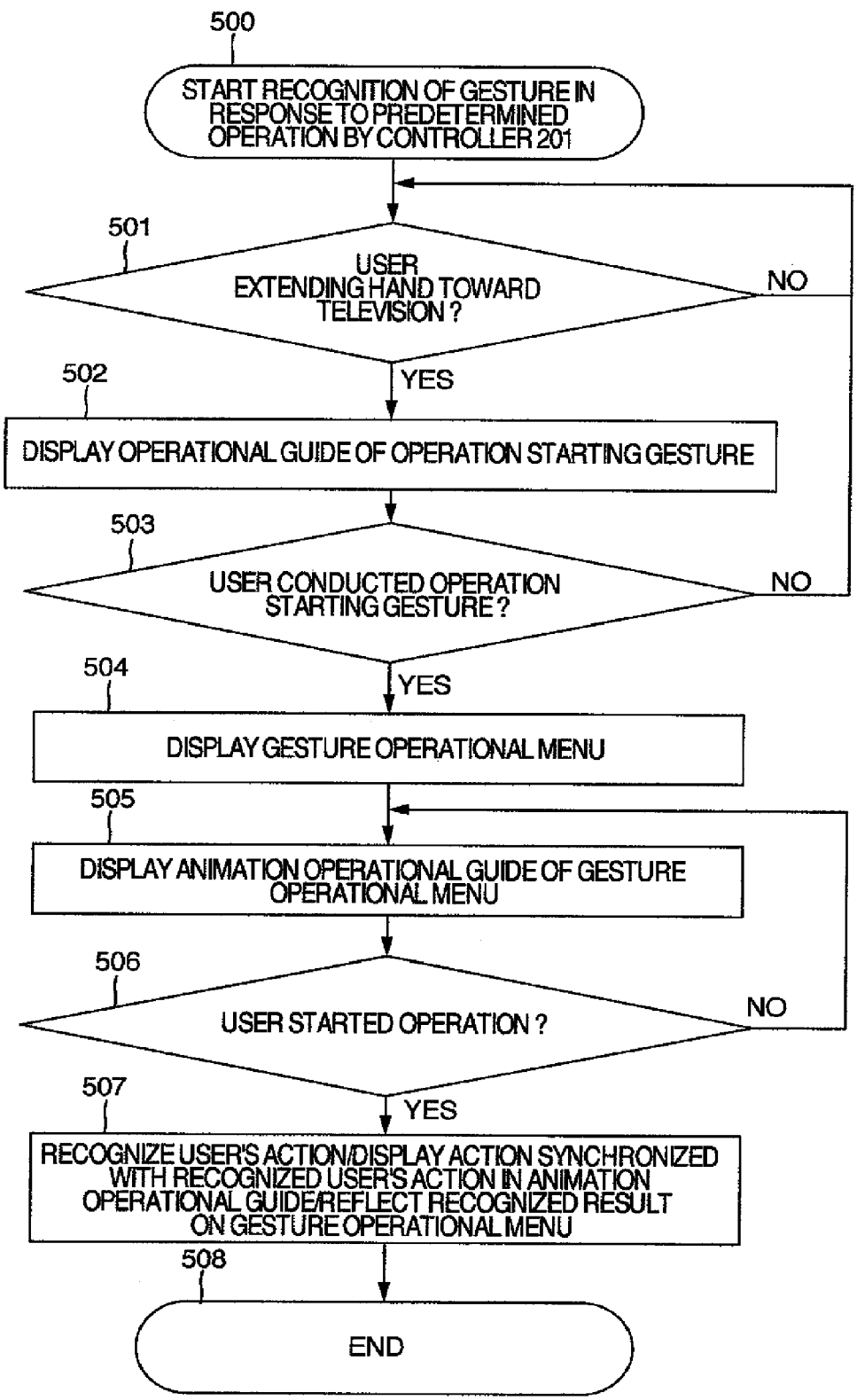
FIG. 5 is a flow chart for explaining the operation of the input device of the embodiment 1.

Explanation will then be made as to how to display the operational guide 104 and the animation operational guide 400 when the user 103 operates the input device 100 with use of FIG. 4 and a flowchart of FIG. 5.

First of all, the user 103 starts the operation of the input device 100 according to a predetermined procedure. This causes the controller 201 of the input device 100 to start recognition of operator hand's motion (gesture) according to the aforementioned procedure (step 500). An example of the state of the user 103 and the input device 100 is shown by "Normal State" in FIG. 4.

As shown by "Start Operation Guide" in FIG. 4, it is assumed that the user 103 extends her or his hand toward the input device 100 (step 501: Yes). The input device 100 recognizes the extending action of the hand of the user 103 and displays the operational guide 104 on the display unit 101 (step 502). At this time, the operational guide 104 is provided to explain the hand side-to-side waving action 300 as an action (operation starting gesture) when the user 103 starts the operation of the input device 100. When the user 103 lowers her or his hand, this causes the input device 100 to erase the display of the operational guide 104 (step 501: No or step 503: No).

Next, as shown by "Starting Operation" in FIG. 4, it is assumed that the user 103 conducts the hand side-to-side waving action 300 toward the input device 100 according to the contents explained in the operational guide 104. Then the input device 100 recognizes the hand side-to-side waving action 300, and displays a gesture operational menu having the operating wheel 301 and the selection items 302 on the display unit 101 as shown by "Animation Operational Guide" in FIG. 4 (step 504). The input device 100 further displays the animation operational guide 400 on the display unit 101 to explain how to operate the gesture operational menu to the user (step 505). At this time, the animation operational guide 400 is displayed so that an imaged person appears on the display unit and as if the person touched the operating wheel 301 with her or his hand and rotated the hand together with the rotation of the wheel. This animation enables the user 103 to intuitively know how to touch the wheel at a desirable position with the hand and how to move the hand and the wheel by a desirable shift to obtain a desirable operation.

It is next assumed that the user 103 conducts the hand rotating action 303 according to the displayed animation operational guide 400 as shown by "Operational State" in FIG. 4 (step 506: Yes), then the input device 100 recognizes the action of the user 103, displays an action synchronized with the recognized action based on the animation operational guide 400, and reflects the recognized action on the gesture operational menu (step 507). In other words, when the user conducts the hand rotating action 303, the person shown by the animation operational guide 400 touches its hand on the operating wheel 301 and rotates the operating wheel 301, thus rotatably shifting the selection items 302 even on the display screen.

Figure 6:
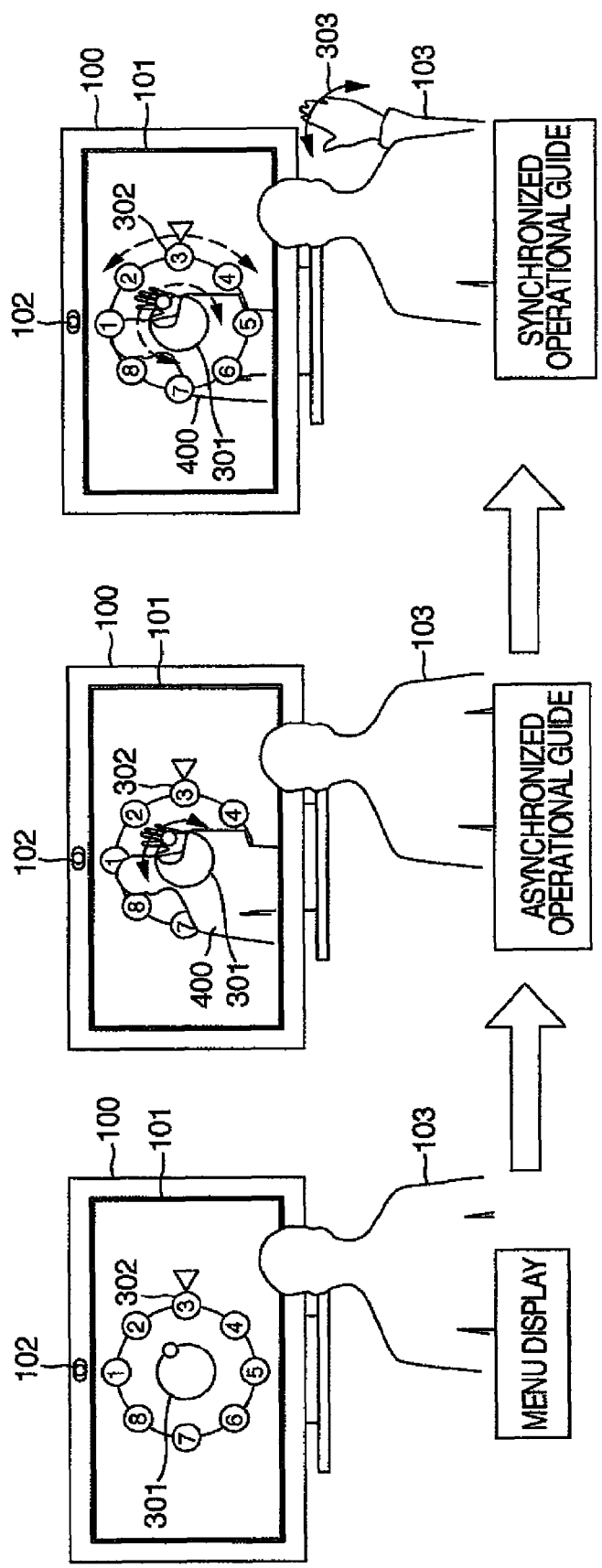
FIG. 6 is a diagram for explaining operations of the user of the embodiment 1 and associated operations of the input device.

In this manner, the animation operational guide 400 is used as an asynchronized operational guide to cause the animation to be varied independently of user's action prior to the operation of the user in the step 505. In the step 507, when the user starts the operation, the animation operational guide 400 acts as a synchronized operational guide to cause the animation to be varied in synchronism with the operation of the user 103 (refer to FIG. 6).

In this way, the input device 100 recognizes a hand moving action of the user 103, and displays the operational guide 104 or the animation operational guide 400 according to the recognized action to present an action (gesture) valid for the operation to the user 103. Thus, since the user 103 can know and confirm what action (gesture) at what timing results in a desired operation, the user can smoothly conduct such an operation as to display the menu or to select the menu items.

The asynchronized operational guide is useful for the user before operating the device to know or understand what action enables what operation by varying the animation. In the present embodiment, the operating wheel 301 and the selection items 302 are illustrated in the display screen. These wheel and items are useful especially for a user who does not understand what action is required for a picture, a figure or an image which can be moved by an operation.

Since the above synchronized operational guide displays the action of the user after her or his action to be conducted in the form of an animation and also causes an actual operation or no operation, the synchronized operational guide can make the user intuitively know whether or not each user's action was recognized. Thus, the user can modifies her or his action so as to avoid an unintended operation.

Embodiment 2:

An embodiment 2 will next be explained. The present embodiment is different from the embodiment 1 in how to operate the input device 100. Thus explanation will be made as to how to operate the input device 100 and how to display an operational guide when an action of the user with both hands enables the user to operate the input device 100. The input device 100 of the present embodiment 2 has substantially the same arrangement as the embodiment 1, but different therefrom in user operating manner.

The present embodiment will be explained by referring to attached drawings, in which constituent elements having functions similar to the constituent elements of the aforementioned embodiment are denoted by the same reference numerals, and explanation thereof is omitted.

Figure 7:
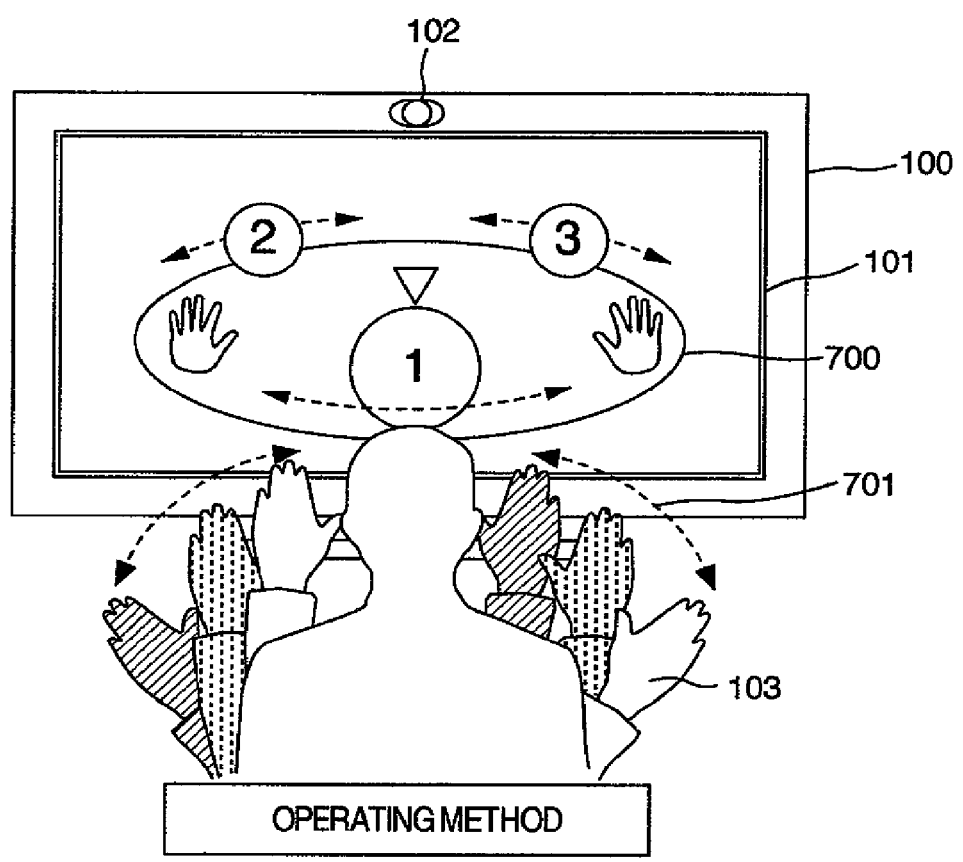
FIG. 7 is a diagram for explaining how a user operates an input device in accordance with an embodiment 2.

FIG. 7 illustrates a state of a user's hand action and a GUI displayed on the display unit 101 when the user operates the input device 100 in the present embodiment. In an operational menu 700 displayed on the display unit 101, three selection items are located on a circular table in a pseudo 3-dimensional space. One of the selection items positioned at user side in front of the screen is selected. In the operational menu 700, presentation of an appearance of both hands' shapes overlapped on the circular table to the user 103 can give the user 103 an image as if the user placed the both hands on the table and turned the table. Since a user's hand action 701 indicates to move the both hands along a circle orbit in order for the user 103 to operate the operational menu 700. In this manner, the user can rotate the circular table and position desired one of the selection items in front of the display screen.

Figure 8:
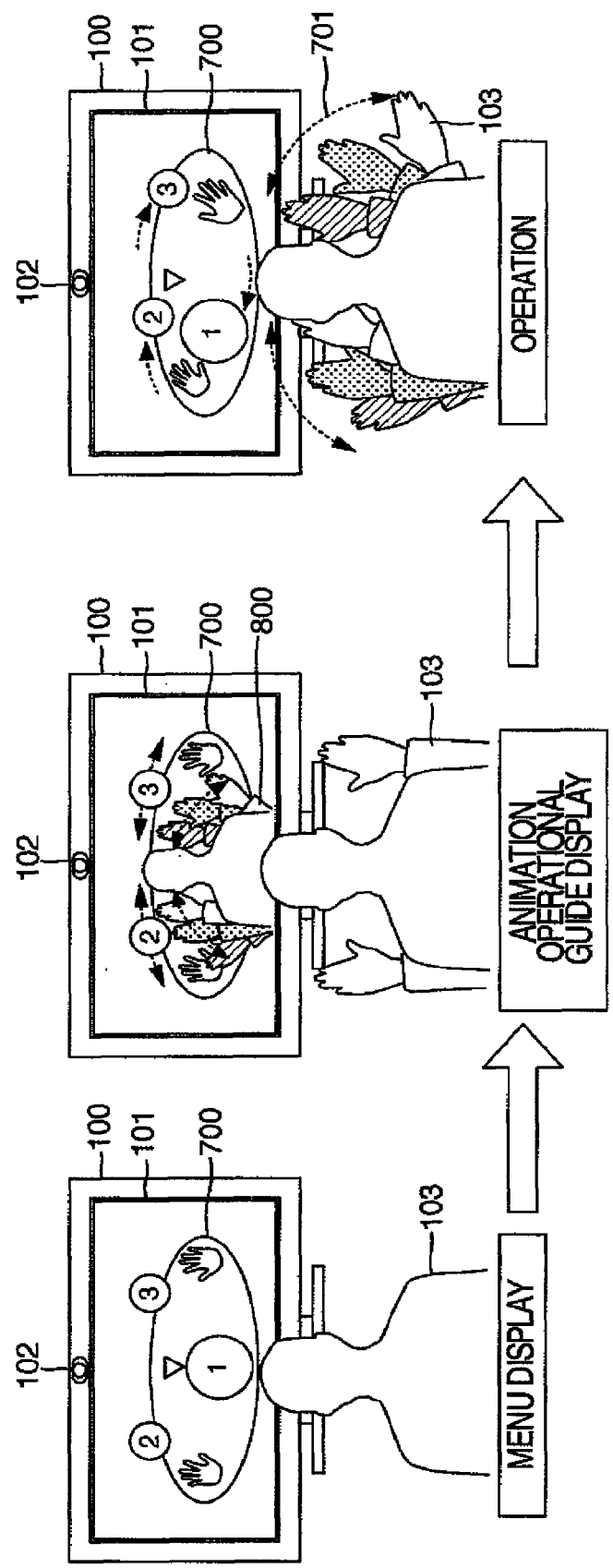
FIG. 8 is a diagram for explaining operations of the user of the embodiment 2 and associated operations of the input device.

Explanation will then be made as to the operation of the input device 100 and how to display an operational guide in the present embodiment by referring to FIG. 8.

An illustration shown by "Menu Display" in FIG. 8 indicates a state in which a menu is displayed in a manner similar to in the embodiment 1. The input device 100 can recognize a hands' action of the user 103 in a manner similar to in the embodiment 1. When the user 103 extends her or his both hands toward the input device 100, an animation operational guide 800 appears as shown by an illustration of "Animation Operational Guide Display" in FIG. 8. The animation operational guide 800 is displayed as a picture of a simulation of an action of both hands of the user, that is, as a dynamic picture image when the user 103 conducts to operate the operational menu 700. When the user 103 then starts the operation of the operational menu 700 according to an operation explained in the animation operational guide 800, the display of the animation operational guide 800 disappears and the action of the user 103 reflects on the operation of the operational menu 700 as shown by "Operation" in FIG. 8.

In this way, the input device 100 provides an image of an operational method in the form of the shape or appearance of the operational menu 700 to the user 103. Further, when the user 103 tries to actually conduct an operation based on the above image, the animation operational guide 800 explaining the detailed operating method of the user is presented to the user.

As a result, the user can receive a specific guide relating to the operation at a timing of her or his action. Accordingly, the user can smoothly operate the menu items while understanding the validity of an action being conducted by the user or how to operate the input device.

Figure 9:
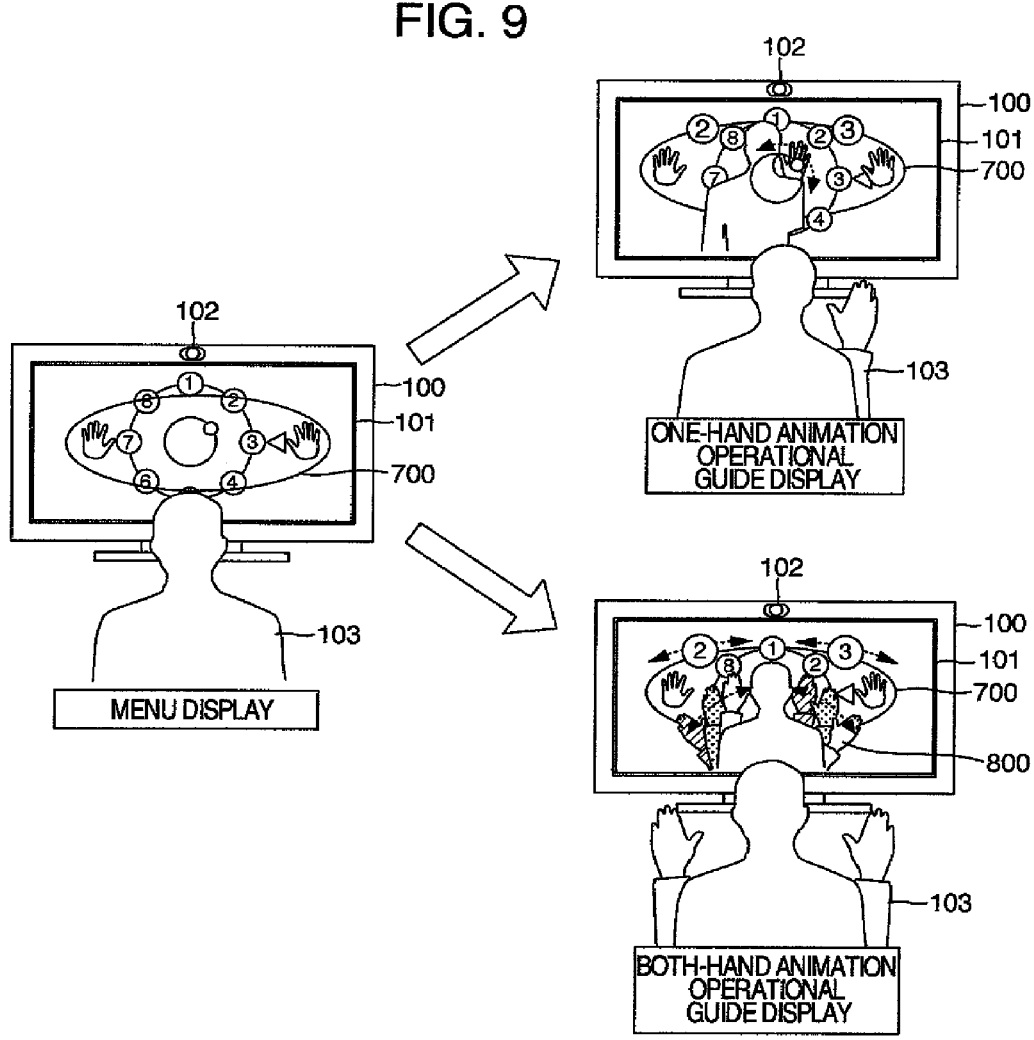
FIG. 9 is a diagram for explaining operations of the user of the embodiment 2 and associated operations of the input device.

In this connection, the operational menu 700 may be a combination with the operational menu having the operating wheel 301 and the selection items 302 explained in the embodiment 1, for example, as shown in FIG. 9. With this arrangement, when the user 103 extends her or his one hand toward the input device 100, an animation operational guide for one hand operation is displayed. When the user 103 extends her or his both hands toward the input device 100, an animation operational guide for both hands operation is displayed. In this manner, the user can image a plurality of operating patterns via the shape or appearance of such menu or menus and can be guided by the menu or menus of the operating method when the user actually wants to perform a specific operation over the input device.

Embodiment 3:

Explanation will next be made as to an embodiment 3. Explanation will be made as to an input device of the embodiment 3 which can attain an operating method similar to in the embodiment 2 by displaying no animation operational guide and displaying a user's operational image at a location on which an operation is applied in the operational menu in the input device 100 of the embodiment 2.

The present embodiment will be explained by referring to the accompanying drawings. In the drawings, constituent elements having functions equivalent to in the aforementioned embodiments are denoted by the same reference numerals, and explanation thereof is omitted.

Operations of the input device 100 and a displaying method of an operational image of the present embodiment will be explained by using FIG. 10.

An operational image 1000 of FIG. 10 is an image of actions of user's hands. This image presents to the user a method when the user grasps two selection items on the operational menu with her or his both hands and turns a circular table in the operational menu 700. When the user 103 extends her or his both hands toward the input device 100, this causes the operational image 1000 to appear as shown by "Raised Both Hands State 1" in FIG. 10. With this, the user 103 can know the fact that the action being conducted by the user was put in a valid state or how to operate the input device. An illustration shown by "Raised Both Hands State 2" in FIG. 10 indicates a state when the user 103 extends her or his both hands at a position higher than in the "Raised Both Hands State 1" of FIG. 10. Even in "Raised Both Hands State 2" of FIG. 10, the displayed state of the operational image 1000 is the same as in "Raised Both Hands State 1". Accordingly, the user 103 can recognize that the input device 100 operates in the same way if the both hands are extended independent of the position of the extended user's hands.

In this way, the input device 100 is independent of variations in the operation of the input device caused when the user 103 has different action positions, and displays the operational image 1000 at an actual location on which an operation is applied on the operational menu according to a simple operation. As a result, the user, when operating the input device, can know the fact that the input device is actually in an operable state, and simultaneously can confirm the location on which an operation is applied on the operational menu and operate the input device through such an action as not to require accuracy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display device comprising:
an input unit configured to input image signals of an operator who has been imaged;
a motion detector configured to detect a motion of the operator based on the input image signal;
a display unit configured to display a menu screen which can be operated by gesturing of the operator, wherein the display unit displays the menu screen as acted upon by the gesturing of the operator while image signals of the operator are received at the input unit; and
a controller configured to recognize the gesture of the operator following a predetermined pattern based on the motion of the operator detected by the motion detector and determines the operation for the menu screen to control the image display device, wherein,
when the controller recognizes that the motion of the operator detected by the motion detector corresponds to a first gesture, the controller displays an operation guide for presenting to the operator how to operate the menu screen on the display unit with the menu screen, the operation guide including a certain video which is unrelated to any motion of the operator,
when the controller recognizes that the motion of the operator detected by the motion detector corresponds to a second gesture presented by the operation guide, the controller enables the operation of the menu screen by the second gesture.

2. The image display device according to claim 1, wherein the operation guide includes a video of an animation.

3. The image display device according to claim 1, wherein when the controller enables the operation of the menu screen by the second gesture, the operation guide includes a video which moves according to the motion of the operator.

4. The image display device according to claim 1, wherein the menu screen includes a plurality selection items.

5. The image display device according to claim 1, wherein when the controller enables the operation of the menu screen by the second gesture, the operation guide disappears from the screen of the display unit.

* * * * *